UNITED STATES PATENT OFFICE.

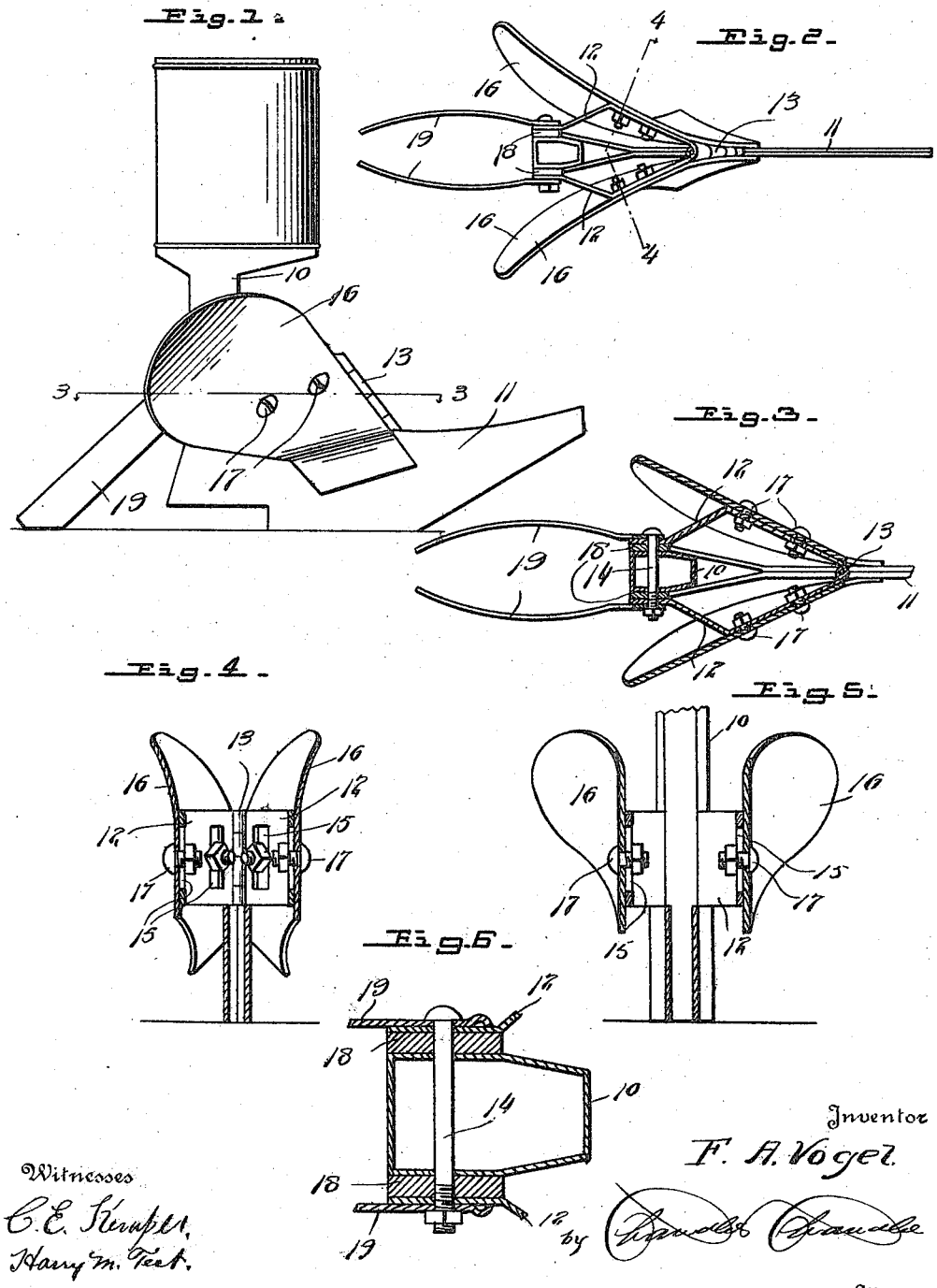

FREDERICK A. VOGEL, OF MANITO, ILLINOIS.

PLANTER ATTACHMENT.

1,184,900. Specification of Letters Patent. Patented May 30, 1916.

Application filed July 27, 1914. Serial No. 853,355.

*To all whom it may concern:*

Be it known that I, FREDERICK A. VOGEL, a citizen of the United States, residing at Manito, in the county of Mason, State of Illinois, have invented certain new and useful Improvements in Planter Attachments; and I do hereby declare the following to be a full, clear, and exact description of the invention, such as will enable others skilled in the art to which it appertains to make and use the same.

This invention relates to improvements in planter attachments.

The principal object of the invention is to provide a device for furrowing out the corn as it is planted.

Other objects and advantages will be apparent from the following description, when taken in connection with the accompanying drawings.

In the drawings: Figure 1 is a side elevation of a portion of a planter showing my invention applied thereto. Fig. 2 is a top plan view, portions of the planter being shown in section. Fig. 3 is a horizontal sectional view on the line 3—3 of Fig. 1, slightly enlarged. Fig. 4 is a transverse sectional view on the irregular line 4—4 of Fig. 2, looking in the direction of the arrow. Fig. 5 is a section on the same line looking in the opposite direction. Fig. 6 is an enlarged sectional view similar to Fig. 3, parts being broken away.

Referring particularly to the accompanying drawings, 10 represents the leg of the planter which carries the runner or shoe 11. Disposed on each side of the leg is a casting 12, the forward ends of which converge and are hinged together at 13. The rear ends of the castings are disposed in parallel relation and on opposite sides of the leg 10, both the castings and the leg being formed with slots through which is disposed the bolt 14. This permits the castings to be adjusted vertically on the leg and forwardly and rearwardly with respect thereto. The convergent portions of the castings are formed with vertical slots 15 which register with openings in the mold-boards 16, these mold-boards being secured to the castings by means of the bolts 17. Below the hinge, the forward edges of the mold-boards are separated slightly to permit the runner 11 to extend forwardly therethrough. On each side of the leg 10, and between the leg and rearward portions of the castings are the spacing blocks 18 by means of which the castings can be swung so as to move the mold-boards to greater or lesser distances apart, according to the width of the furrow desired. Also mounted on the bolt 14 are the rearwardly extending curved covering blades 19 which cut the soil at the sides of the furrow so as to throw soil therein to cover the seed deposited in the furrow.

What is claimed is:

An attachment for planters comprising a pair of members hinged at their forward ends and adapted to be adjustably mounted on the planter leg, mold boards adjustably mounted on said hinged members to straddle the runner of the planter, and covering shoes adapted for adjustable engagement with the planter leg to extend rearwardly therefrom.

In testimony whereof I affix my signature, in the presence of two witnesses.

FRED. A. VOGEL.

Witnesses:
 JESSE BLACK, Jr.,
 FRED J. SCHILPP.

Copies of this patent may be obtained for five cents each, by addressing the "Commissioner of Patents, Washington, D. C."